Aug. 9, 1966  C. A. BURTON  3,265,186
WAREHOUSE CONVEYOR SYSTEM
Filed June 23, 1965  4 Sheets-Sheet 1
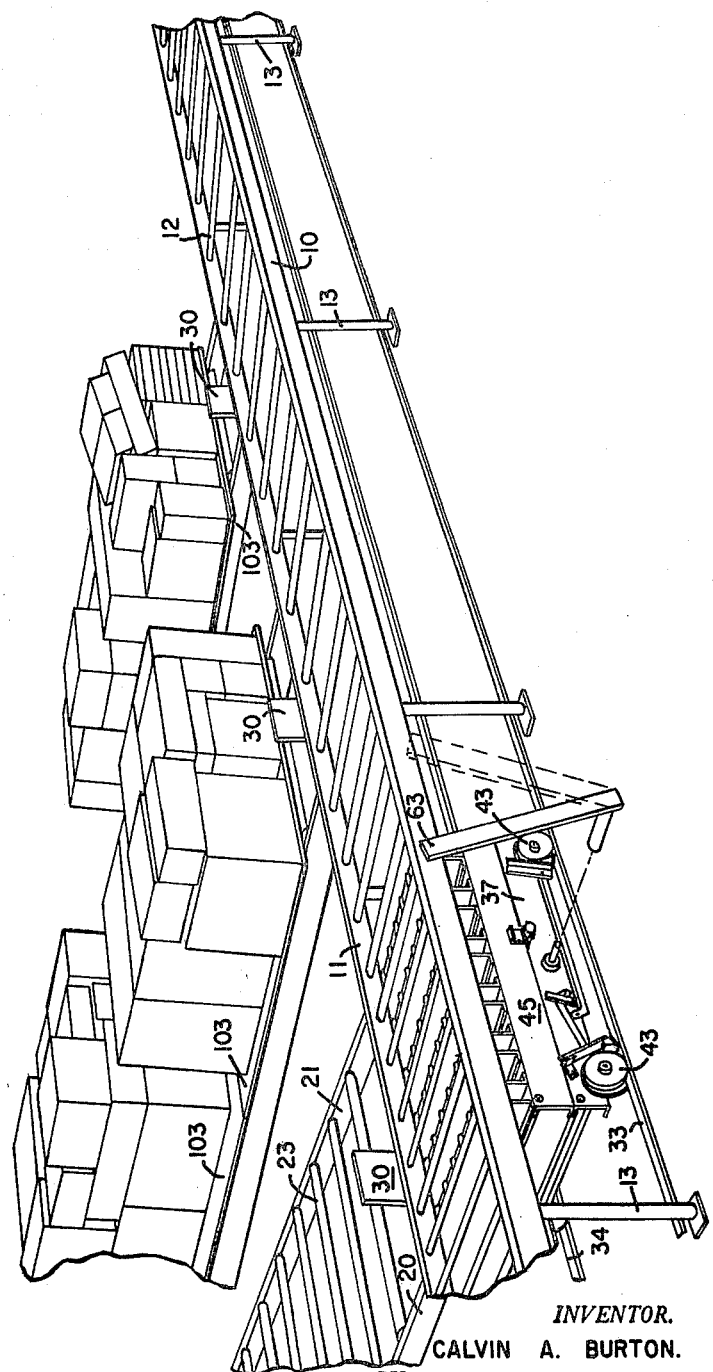
FIG. I
INVENTOR.
CALVIN A. BURTON.
BY
D. Emmett Thompson
ATTORNEY.

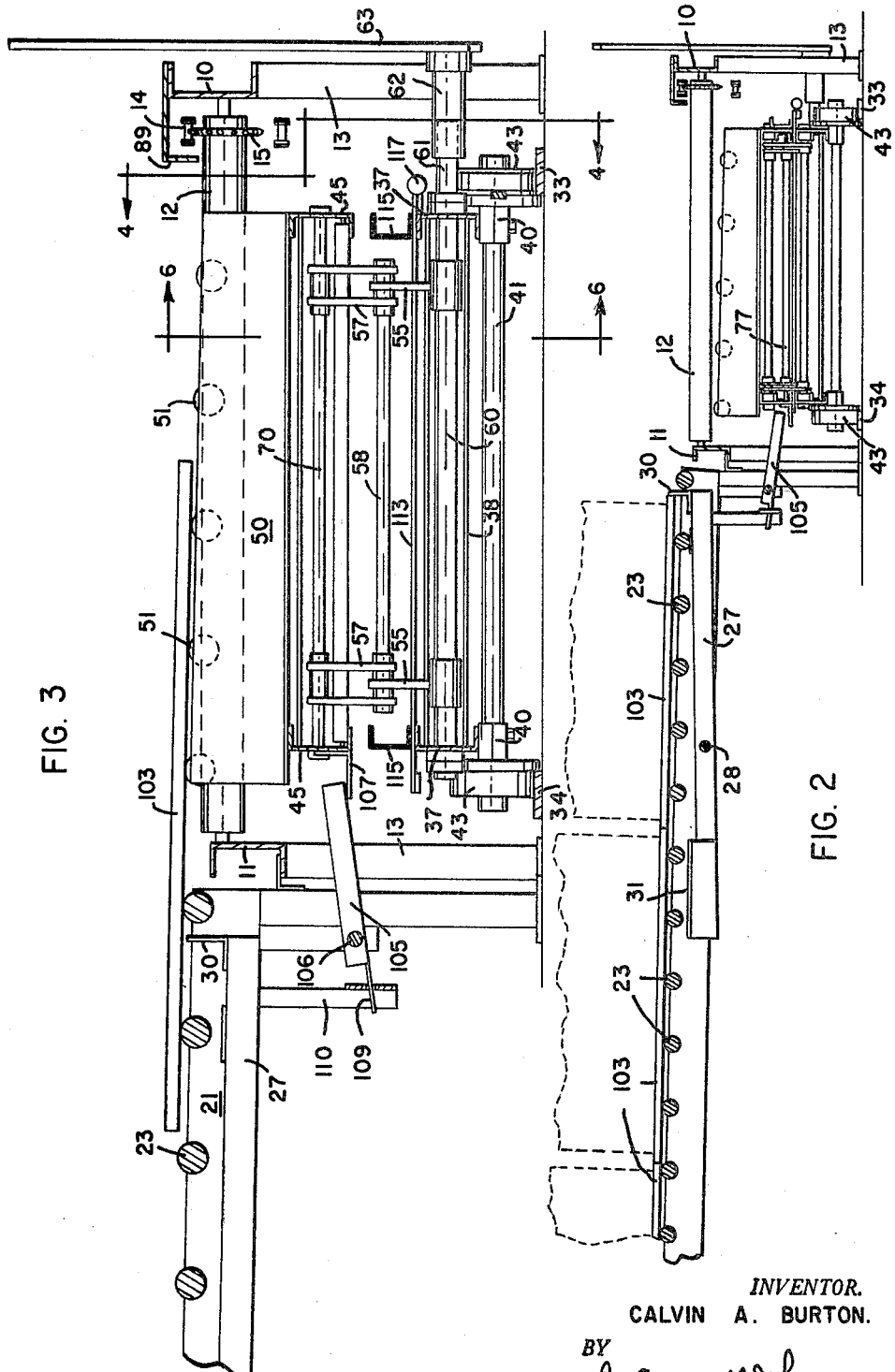

Aug. 9, 1966

C. A. BURTON 3,265,186

WAREHOUSE CONVEYOR SYSTEM

Filed June 23, 1965

INVENTOR.
CALVIN A. BURTON.
BY
D. Emmett Thompson
ATTORNEY.

Aug. 9, 1966

C. A. BURTON 3,265,186

WAREHOUSE CONVEYOR SYSTEM

Filed June 23, 1965

INVENTOR.
CALVIN A. BURTON.
BY
D. Emmett Thompson
ATTORNEY.

3,265,186
WAREHOUSE CONVEYOR SYSTEM
Calvin A. Burton, Syracuse, N.Y., assignor to Lamson Corporation, Syracuse, N.Y., a corporation of New York
Filed June 23, 1965, Ser. No. 466,345
6 Claims. (Cl. 198—79)

This invention relates to a warehouse conveyor system and is intended particularly for installation in a large warehouse and functions to transfer picked orders to a shipping dock.

At present there are chain store establishments which operate as many as 250 retail stores in a territory. The retail outlets periodically transmit orders to a central warehouse for needed merchandise. Where the retail outlets are of the general department store type, it is necessary to maintain a collection of several thousand different items. Such items vary greatly in size and weight. Accordingly, the picking of a large truck load order of such items and getting the assembled order into the shipping truck presents a problem of substantial magnitude because of the time and labor involved.

This invention has as an object a warehouse shipping conveyor system which functions with maximum efficiency and minimum manual effort for the accumulation of items making up an order and transmitting the same to the shipping dock.

The invention consists in the novel features and in the combinations and constructions hereinafter set forth and claimed.

In describing this invention, reference is made to the accompanying drawings in which like characters designate corresponding parts in all the views.

In the drawings:

FIGURE 1 is a view showing, in isometric perspective, a portion of the shipping conveyor and discharge ends of three of the storage conveyors.

FIGURE 2 is a view looking to the right in FIGURE 1, with a storage conveyor shown in section and showing the article transfer mechanism in the down position.

FIGURE 3 is an enlarged view, similar to FIGURE 2, showing article transfer mechanism raised to the up position, with an article being transferred from a storage conveyor to the shipping conveyor, the view being taken on a line corresponding to line 3—3, FIGURE 4.

Figure 4:
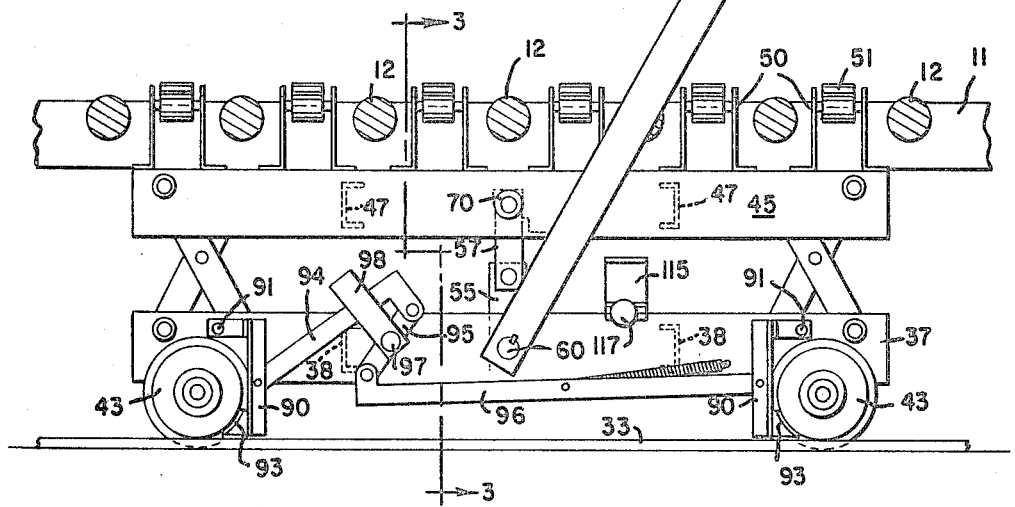
FIGURE 4 is a view taken on a line corresponding to line 4—4, FIGURE 3, showing the transfer mechanism in the up position.

The invention consists generally of an elongated roll shipping conveyor. Preferably, the shipping conveyor is installed in horizontal position, and the rolls of the conveyor are power driven to advance articles to the shipping dock—that is, in a direction to the right, FIGURE 1.

The invention further includes a number of storage conveyors extending normal to the shipping conveyor, with the discharge ends of the storage conveyors terminating at one side of the shipping conveyor. There is a track positioned below the shipping conveyor and extending lengthwise thereof. A carriage is mounted on the track for movement therealong, and is provided with a transfer mechanism. The carriage is movable along the track into registration with a selected one of the storage conveyors, on which there is a procession of articles to be shipped. Each storage conveyor is provided with an escapement at its discharge end and which is operable, when actuated, to effect discharge of an article from the storage conveyor to the shipping conveyor.

The transfer car is provided with transfer mechanism, including article supporting members which are movable upwardly between the rolls of the shipping conveyor to a position above the plane of the load bearing surface of the shipping conveyor rolls for the reception of an article discharged from the storage conveyor. When the article is transferred to the supporting members, the transfer mechanism is lowered, whereby the transferred article is positioned on the rolls of the shipping conveyor, and is thereupon advanced toward the shipping dock.

The shipping conveyor shown is a conventional roll conveyor having side members 10, 11, between which at spaced intervals load bearing rolls 12 are journalled. The side members 10, 11, are supported by uprights 13. Preferably, the shipping conveyor is of the live roll type and rotation may be imparted to the rolls 12 by the upper run 14 of an endless chain engaging sprockets 15 affixed to each of the rolls.

The storage conveyors may be of various types. As here shown, they are also of the roll type consisting of side members 20, 21, between which rolls 23 are journalled. With this type of conveyor, it may be slightly inclined to be of the gravity type, inclining upwardly from the shipping conveyor.

The shipping conveyor is of considerable length and there are a number of the storage conveyors extending laterally from the side 11 of the shipping conveyor. Each storage conveyor is provided at its discharge end with an escapement mechanism which, when actuated, effects the discharge of an article from the storage conveyor toward the shipping conveyor. A simple, but satisfactory, type of escapement is shown in FIGURES 2 and 3. It consists of an arm 27 pivotally mounted intermediate its ends, as at 28, between the side members 20, 21. The arm 27 extends lengthwise of the storage conveyor and is provided at one end with an angle member 30, and at its opposite end with a friction pad 31. In FIGURE 2, the end of the arm 27, carrying the angle member 30, is shown in elevated position above the load surface plane of the rollers 23 for engagement by an article on the lower end of the conveyor to prevent discharge of the article from the conveyor. In FIGURE 3, the lever 27 has been oscillated in a clockwise direction about the pivot 28, moving the stop member 30 downwardly below the plane of the rolls 23, and moving the friction pad upwardly into engagement with a pair of the rolls 23 underneath the next adjacent article, thus preventing rotation of these rolls and accordingly, the advancement of the article thereon.

A pair of rails 33, 34, are fixedly mounted below the shipping conveyor and extend thereunder in parallel spaced apart relation. A transfer car is provided for movement along the rails 33, 34.

The car consists of side channel members 37 maintained in parallel spaced relation by cross members 38. Bearing blocks 40 are secured to the bottom flanges of the side members 37 for the reception of axles 41 provided at their ends with flanged wheels 43 for movement along the track rails 33, 34.

The car is provided with transfer mechanism including channel side members 45 similar to the side members 37, and the same are secured in parallel relation by channel cross members 47. The frame 45, 47, is provided with article supporting members. As here shown, there are a plurality of pairs of angle members 50 fixedly secured to the side members 45 and extending transversely of the carriage. The angle members 50, of each pair, are spaced apart to receive article supporting rollers 51, and the spacing is also such as to permit the frame 45, 47, upon elevation, to move the pairs of angle members 50, and the rollers journalled therebetween in between the load rollers 12 of the shipping conveyor, see FIGURES 4, 5 and 6.

The transfer mechanism, including the frame 45, 47, and the article supporting members 50, 51, is mounted for vertical movement on the transfer car. Normally, the transfer mechanism is positioned in proximity to the car, as shown in FIGURE 5. In this position, the supporting rolls 51 are located below the load rollers 12 of the shipping conveyor to permit movement of the car along the rails 33, 34. The transfer mechanism is elevated to the up position shown in FIGURE 4, wherein the rolls 51 are positioned above the load surface plane of the rolls 12 for the reception of an article from a storage conveyor.

Vertical motion is imparted to the transfer mechanism by pairs of links 55, 57, the links of each pair are pivotally jointed together by a pin 58. This linkage is located centrally between the ends of the transfer car and the transfer mechanism. There are two pairs of the links 55, 57, joined by the rod 58, see FIGURE 3. The links 55 are fixedly mounted on a shaft 60 journalled in the side members 37 of the transfer car. The end 61 of the shaft 60 extends laterally from the car for the reception of a socket 62 fixed to an operating handle 63. The upper ends of the links 57 of each pair are pivotally attached to a rod 70 extending between the side members 45 of the transfer mechanism.

Figure 5:
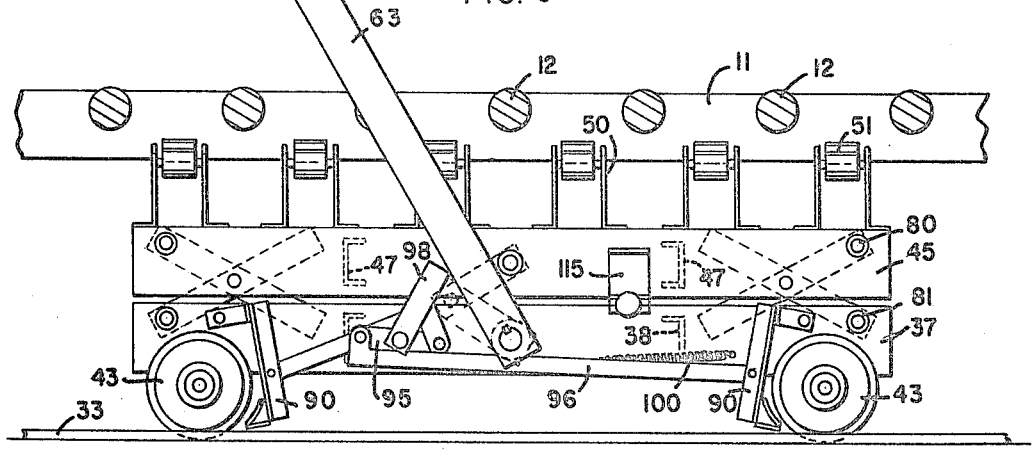
FIGURE 5 is a view similar to FIGURE 4, showing the transfer mechanism in the down position.
Figure 6:
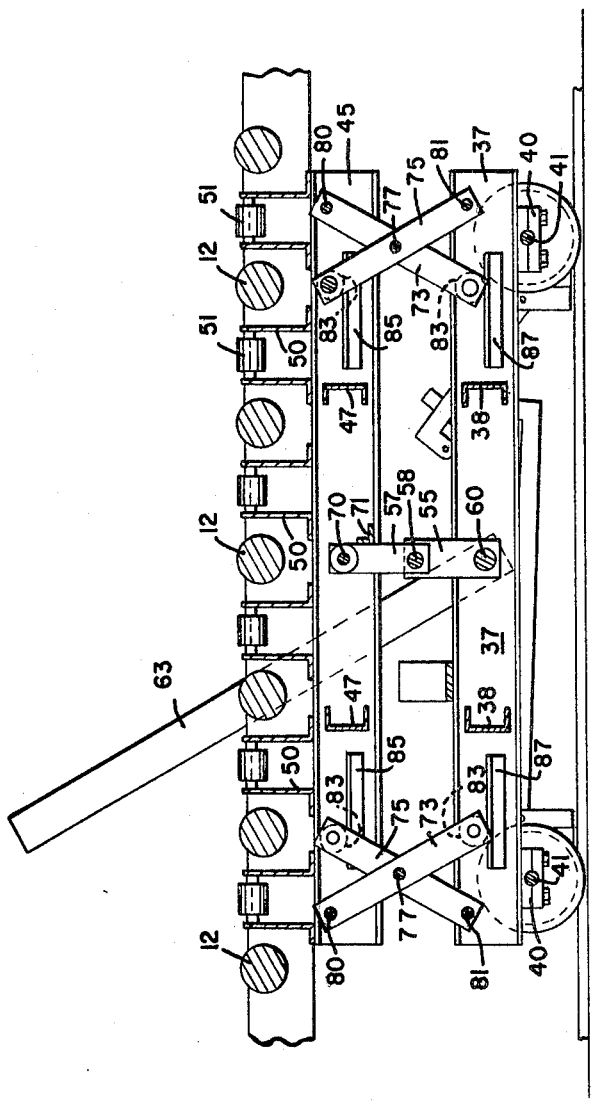
FIGURE 6 is a view taken on line 6—6, FIGURE 3.

When the transfer car is moved into registration with a selected one of the storage conveyors, the handle lever 63 is applied to the end 61 of shaft 60, and the handle moved in a clockwise direction from the position shown in FIGURE 5 to the position shown in FIGURE 4. This effects movement of the links 55, 57, to vertical position, as shown in FIGURES 4 and 6. There is an angle iron member 71 fixed at its ends to the lower flanges of the side members 45, and is positioned to serve as a stop engaged by the links 57 when the transfer mechanism is in elevated position, see FIGURE 6. The stop member 71 is located to be engaged by the links 57 when the pivot point 58 has passed slightly beyond the vertical plane intercepting the axes of the shafts 60, 70, so that the transfer mechanism is maintained in elevated position during the reception of an article transferred from the storage conveyor. Upon counterclockwise rotation of the shaft 60 by the handle lever 63, the transfer member is lowered, to move the transferred article onto the load rolls 12 of the shipping conveyor for movement of the transferred article toward the shipping dock.

During its vertical movement, the transfer mechanism is maintained in parallel relation with the transfer car by four pairs of links 73, 75. There are two pairs of these links positioned at one end of the car and the transfer structure, and there are two pairs of these links positioned at the opposite end of the transfer car and structure. The pairs of links 73, 75, are pivotally connected intermediate their ends by rods 77. The upper ends of the links 73 are pivotally connected to the side members 45 by pins 80. The lower ends of the links 75 are pivotally connected to the side members 37 by pins 81, see FIGURE 6. The upper ends of the links 75 and the lower ends of the links 73 are provided with rollers 83. Angle members 85 are fixed to the inner surface of the side members 45 and serve, in conjunction with the upper flanges thereof, to provide a track for the rollers 83 on the upper ends of the links 75. Like angle members 87 are fixed to the inner surfaces of the side members 37 and provide, in conjunction with the upper flanges of the members 37, a trackway for the rollers 83 on the lower ends of the links 73. This linkage effects a parallelogram movement for the transfer member.

Preferably, the plane of the article engaging surfaces of the rollers 51 inclines downwardly in a direction from the storage conveyors, see FIGURE 3. When the transfer mechanism is moved to up, or elevated position, this inclination of the rolls 51 is such as to form a continuation of the inclination of the rollers 23 in the storage conveyor, so that the article discharged from the storage conveyor can move by gravity over the rollers 51 against the guide 89 extending along the outer side member 10 of the shipping conveyor, see FIGURE 2.

Means is provided for maintaining the transfer car and transfer mechanism in registration with a selected one of the storage conveyors. This means may take the form of a brake mechanism, as shown in FIGURES 4 and 5. Brake members 90 are pivotally mounted on the outer surface of the outer side member 37, as at 91. Each of the members 90 is provided with a brake shoe 93 for engagement with the periphery of the flanged wheels 43 on the rail 33. A link 94 is pivotally mounted at one end to one of the brake members 90, and at its opposite end it is pivotally connected to a link 95. The opposite end of the link 95 is pivotally connected to a link 96, which in turn is pivotally connected to the other brake member 90.

The link 95 is pivoted intermediate its ends, as at 97, to the side member 37 and an actuator 98 is fixedly attached to the link 95. When the actuator and the link 95 are moved in a counterclockwise direction from the position shown in FIGURE 5 to the position shown in FIGURE 4, the brake members 90 are urged into frictional engagement with the wheels 43, and are maintained in braking engagement by tension spring 100, one end of which is attached to the link 96 and the opposite end to the side member 37. When actuator 98 is moved to effect release of the brake members 90, as shown in FIGURE 5, the link 95 is moved slightly below the horizontal plane into self-locking position.

The articles accumulated on the storage conveyors may be of considerable size, such as stoves, refrigerators, etc., in which event the packaged article can be placed directly on the storage conveyor, and transferred to the shipping conveyor. In most instances, however, the packaged merchandise consists of small and medium sized packages and vary greatly in dimensions. In that case, it has been found more efficient and practical to accumulate a plurality of such packages on a flat pallet 103. In this way, a great many of such packages can be assembled on a pallet.

When it is desired to transfer an article or an accumulation of packages on a pallet, the transfer car is moved along the rails 33, 34, into registration with the selected storage conveyor. The elevating handle lever 63 is applied to the end 61 of the shaft 60 and by movement in a clockwise direction, the transfer mechanism is elevated to up position to move the transfer rolls 51 above the plane of the load bearing surface of the rollers 12. Upon such upward movement of the transfer mechanism, the escapment bar 27 is rotated in a clockwise direction from the position shown in FIGURE 2 to the position shown in FIGURE 3. This operation of the escapment mechanism is brought about by a bar 105 pivotally mounted at 106 on a shaft extending between supporting members of the storage conveyor. An angle member 107, FIGURE 3, is secured to the side member 45 of the transfer frame, and upon upward movement thereof engages the bar 105 moving it in a counterclockwise direction. The opposite end portion 109 of the bar 105 is in engagement with a member 110 depending from the bar 27, effecting clockwise movement of this bar, to move the stop 30 downwardly to permit the article or pallet to be discharged onto the rollers 51, as shown in FIGURE 3. At the same time, the pate 31 is moved upwardly into engagement with two of the rollers under the next succeeding pallet to prevent forward movement of the same.

Usually, there will be several articles or packages on a storage conveyor making up an order. To avoid the necessity of moving the transfer mechanism all the way down, as shown in FIGURE 5, and then upwardly again for the transfer of the next article, an auxiliary stop mechanism is provided. This may take the form of a bar 113, FIGURE 3, extending across the upper flanges of the side members 37. Stop members 115 are secured to the bar 113 and are spaced apart complemental to the spacing of the side members 37 and 45. The bar 113 is mounted for sliding movement on the transfer car and is provided with an operating manual 117 available on the outer side of the car. When the bar 113 is moved inwardly, as shown in FIGURE 3, the stop members 115 are positioned for engagement by the side members 45 when the transfer mechanism is lowered from the up position to an intermediate position. This downward movement of the transfer mechanism is sufficient to move the rollers 51 below the plane of the rollers 12, for the reception thereon of the transferred article. Inasmuch as the shipping conveyor is power operated, the transferred article immediately advances. The operator need only elevate the transfer mechanism from the intermediate positions for the reception and transfer of the next succeeding article on the storage conveyor. When the bar 113 is moved to the right, FIGURE 3, the stop members 115 are moved out of registration with the side members 45 so that the transfer mechanism may be moved to the down position for movement of the transfer car along rails to another storage conveyor.

This arrangement provides for the quick and efficient transfer of articles from the storage conveyors. Also, it gives the operator an opportunity to straighten up, if need be, the assembled packages on a pallet.

What I claim is:

1. A warehouse conveyor system comprising an elongated shipping conveyor including a pair of side members and load supporting rolls journalled between said side members, a plurality of storage conveyors, each adapted for advancing a procession of articles, said storage conveyors extending normal to said shipping conveyor with the discharge ends of said storage conveyors terminating adjacent one side of said shipping conveyor, an escapement mechanism at the discharge end of each of said storage conveyors and operable, when actuated, to discharge an article from said storage conveyor, rails extending lengthwise of said shipping conveyor beneath the same, a transfer car movable along said rail beneath said shipping conveyor into registration with a selected one of said storage conveyors, an article transfer mechanism mounted on said car and having article supporting members extending in a direction transversely of said shipping conveyor and spaced apart complemental to the spacing between the rolls of said shipping conveyor, said transfer mechanism being mounted on said car for vertical movement from a down position, with said supporting members positioned below the rolls of said shipping conveyor, to an up position to move said supporting members between the rolls of said shipping conveyor and above the plane of the load bearing surface of the rolls of said shipping conveyor for the reception of an article discharged from a storage conveyor, means operable to actuate said escapement mechanism for the discharge of an article to said supporting members, said supporting members being operable upon downward movement of said transfer mechanism to position the transferred article on the rolls of said shipping conveyor.

2. A warehouse conveyor system as set forth in claim 1, including means operable to maintain said transfer car in registration with a selected one of said storage conveyors.

3. A warehouse conveyor system as set forth in claim 1, in which said article supporting members consist of rows of antifriction members.

4. A warehouse conveyor system as defined in claim 1, including stop means carried by said car and operable to limit downward movement of said transfer mechanism to a position intermediate said up and down positions.

5. A warehouse conveyor system comprising an elongated live roll shipping conveyor, a plurality of gravity roller storage conveyors, each adapted for advancing a procession of articles, said storage conveyors extending normal to said shipping conveyor, with the discharge ends of said storage conveyors terminating adjacent one side of said shipping conveyor, an escapement mechanism at the discharge end of each of said storage conveyors and operable, when actuated, to discharge an article from said storage conveyor, rails extending lengthwise of said shipping conveyor beneath the same, a transfer car movable along said rails into registration with a selected one of said storage conveyors, an article transfer mechanism mounted on said transfer car and having article supporting members extending in a direction transversely of said shipping conveyor and spaced apart complemental to the spacing between the live rolls of said shipping conveyor, said transfer mechanism being mounted on said car for vertical movement from a down position below the rolls of said shipping conveyor to an up position to move said supporting members between the live rolls of said shipping conveyor and above the plane of the load bearing surface of the rolls of said shipping conveyor, means operable upon the elevation of said transfer mechanism to actuate said escapement mechanism for the discharge of the lowermost article from said storage conveyor onto said supporting members whereby, upon downward movement of said transfer mechanism, the transferred article is positioned on the live rolls of said shipping conveyor.

6. A warehouse conveyor system comprising an elongated live roll shipping conveyor, a plurality of gravity roller storage conveyors, each adapted for advancing a procession of articles, said storage conveyors extending normal to said shipping conveyor with the discharge ends of said storage conveyors terminating adjacent one side of said shipping conveyor, an escapement mechanism at the discharge end of each of said storage conveyors and operable, when actuated, to discharge an article from said storage conveyor, rails extending lengthwise of said shipping conveyor beneath said live rolls, a transfer car mounted on said rails for movement therealong, a transfer mechanism mounted on said car and positioned below said live rolls of said shipping conveyor to permit movement of the car along said rails, said transfer mechanism including article supporting members extending in a direction transversely of said shipping conveyor and spaced apart complemental to the spacing between the live rolls of said shipping conveyor, elevating mechanism carried by said car and operable to impart vertical movement to said transfer mechanism to move said article supporting members to an up position above the plane of the load bearing surface of the live rolls of said shipping conveyor, a handle member having means for detachable connection to said elevating mechanism for operating the same, means operable upon elevation of said transfer mechanism to actuate said escapement mechanism for the discharge of the lowermost article from a storage conveyor onto said supporting members whereby, upon downward movement of said transfer mechanism, the transferred article is positioned on the live rolls of said shipping conveyor.

References Cited by the Examiner

UNITED STATES PATENTS

| | | | |
|---|---|---|---|
| Re. 16,160 | 9/1925 | Drake | 214—16 |
| 798,443 | 8/1905 | Odell | 214—16 X |
| 1,472,054 | 10/1923 | Drake | 214—16 |
| 3,104,004 | 9/1963 | Poel et al. | 198—20 |

EVON C. BLUNK, *Primary Examiner.*

M. L. AJEMAN, *Assistant Examiner.*